US012785451B2

(12) United States Patent
Kawai et al.

(10) Patent No.: US 12,785,451 B2
(45) Date of Patent: Nov. 3, 2026

(54) ELECTRONIC DEVICE, POWER TRANSMISSION SYSTEM, CONTROL METHOD, AND CONTROL PROGRAM

(71) Applicant: KYOCERA Corporation, Kyoto (JP)

(72) Inventors: Katsutoshi Kawai, Ichinomiya (JP); Yuuya Tanaka, Yokohama (JP); Tomoyuki Nakasha, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 295 days.

(21) Appl. No.: 18/572,616

(22) PCT Filed: Jun. 3, 2022

(86) PCT No.: PCT/JP2022/022644
§ 371 (c)(1),
(2) Date: Dec. 20, 2023

(87) PCT Pub. No.: WO2023/276554
PCT Pub. Date: Jan. 5, 2023

(65) Prior Publication Data

US 2024/0291322 A1 Aug. 29, 2024

(30) Foreign Application Priority Data

Jun. 29, 2021 (JP) ................................ 2021-107936

(51) Int. Cl.
*H02J 50/20* (2016.01)
*H02J 50/40* (2016.01)
(Continued)

(52) U.S. Cl.
CPC ............ *H02J 50/20* (2016.02); *H02J 50/402* (2020.01); *H02J 50/80* (2016.02); *H04B 7/06* (2013.01)

(58) Field of Classification Search
CPC .......... H02J 50/20; H02J 50/80; H02J 50/402; H04B 7/06
See application file for complete search history.

(56) References Cited

U.S. PATENT DOCUMENTS 10,153,645 B1 * 12/2018 Bell ........................ H02J 50/40
2019/0391620 A1 12/2019 Matsuo
(Continued)

FOREIGN PATENT DOCUMENTS

JP 5570343 B2 8/2014
JP 2019062701 A 4/2019
(Continued)

*Primary Examiner* — John J Lee
(74) *Attorney, Agent, or Firm* — Studebaker Brackett PLLC

(57) ABSTRACT

A power transmission device according to one aspect includes a plurality of antennas, a controller that controls, for power transmission signals transmitted from the plurality of antennas to a power reception device for power transmission and an information signal transceiver connected by spatial multiplexing, a transmission weight such that a beam is directed toward a first antenna of the power reception device for power transmission and a null is directed toward a second antenna of the information signal transceiver, and a transmitter that can transmit, using the transmission weight, a transmission signal obtained by superimposing the power transmission signal and an information communication signal.

7 Claims, 6 Drawing Sheets

(51) Int. Cl.

| | |
|---|---|
| ***H02J 50/80*** | (2016.01) |
| ***H04B 7/06*** | (2006.01) |

(56) References Cited

U.S. PATENT DOCUMENTS

| | | | | |
|---|---|---|---|---|
| 2020/0052530 | A1 | 2/2020 | Adachi et al. | |
| 2020/0091602 | A1* | 3/2020 | Murata | H02J 50/90 |
| 2020/0136435 | A1* | 4/2020 | Mitomo | H02J 50/402 |

FOREIGN PATENT DOCUMENTS

| | | | |
|---|---|---|---|
| JP | 2019-221076 | A | 12/2019 |
| JP | 2020-025400 | A | 2/2020 |
| JP | 2020048285 | A | 3/2020 |

* cited by examiner

ELECTRONIC DEVICE, POWER TRANSMISSION SYSTEM, CONTROL METHOD, AND CONTROL PROGRAM

TECHNICAL FIELD

The present application relates to an electronic device, a power transmission system, a control method, and a control program.

BACKGROUND OF INVENTION

Patent Document 1 discloses a contactless power supply device that uses a signal obtained by combining a plurality of high-frequency signals having different frequencies as a power supply signal, sets a wavenumber of the resulting high-frequency signal in accordance with an amount of power to be supplied to a power receiver, and phase-modulates the high-frequency signal to implement simultaneous transmission of power and information.

CITATION LIST

Patent Literature

Patent Document 1: JP 5570343 B

SUMMARY

Problem to be Solved

When implementing simultaneous transmission of power and information, the wireless power required for power supply is much larger than the power required for communication. For this reason, when a wide band is used for the power supply as in the related art, this power may influence other systems whose frequencies are adjacent, which is a concern. To avoid such influence, information may be transmitted by using orthogonal frequency division multiplexing (OFDM), which is a digital modulation scheme, in which a power transmission signal is inserted into a null subcarrier of the OFDM signal, which is a part of the OFDM signal that is not used. However, in this case, a special configuration such as separating a power signal and an information signal is required for a power reception-side device, which may be disadvantageous in terms of power consumption and cost. Therefore, there is room for improving technology for simultaneous wireless transmission of information and power without transmitting a power supply signal over a wide band or using a special configuration for a power reception-side device.

Solution to Problem

An electronic device according to one aspect includes: a plurality of antennas; a controller configured to control, for power transmission signals transmitted from the plurality of antennas to a power reception device for power transmission and an information signal transceiver connected by spatial multiplexing, a transmission weight such that a beam is directed toward a first antenna of the power reception device for power transmission and a null is directed toward a second antenna of the information signal transceiver; and a transmitter configured to transmit, using the transmission weight, a transmission signal obtained by superimposing the power transmission signal and an information communication signal.

A power transmission system according to one aspect includes an electronic device, and a power reception unit to which power is fed by a radio wave received from the electronic device. The electronic device includes a plurality of antennas, a controller configured to control, for power transmission signals transmitted from the plurality of antennas to a power reception device for power transmission and an information signal transceiver connected by spatial multiplexing, a transmission weight such that a beam is directed toward a first antenna of the power reception device for power transmission and a null is directed toward a second antenna of the information signal transceiver, and a transmitter configured to transmit, using the transmission weight, a transmission signal obtained by superimposing the power transmission signal and an information communication signal. The power reception unit includes the first antenna configured to receive the power transmission signal from the electronic device, and the second antenna separated from the first antenna by a predetermined distance and configured to receive the information communication signal that occupies a frequency band different from that of the power transmission signal.

A control method according to one aspect includes: controlling, by an electronic device including a plurality of antennas, for power transmission signals transmitted from the plurality of antennas to a power reception device for power transmission and an information signal transceiver connected by spatial multiplexing, a transmission weight such that a beam is directed toward a first antenna of the power reception device for power transmission and a null is directed toward a second antenna of the information signal transceiver; and causing, by the electronic device, a transmitter to transmit, using the transmission weight, a transmission signal obtained by superimposing the power transmission signal and an information communication signal.

A control program according to one aspect causes an electronic device including a plurality of antennas to execute controlling, for power transmission signals transmitted from the plurality of antennas to a power reception device for power transmission and an information signal transceiver connected by spatial multiplexing, a transmission weight such that a beam is directed toward a first antenna of the power reception device for power transmission and a null is directed toward a second antenna of the information signal transceiver; and causing a transmitter to transmit, using the transmission weight, a transmission signal obtained by superimposing the power transmission signal and an information communication signal.

DESCRIPTION OF EMBODIMENTS

A plurality of embodiments for implementing an electronic device, a power transmission system, a control method, and a control program according to the present application will be described in detail with reference to the drawings. Note that the present application is not limited by the following description. Constituent elements in the following description include those that can be easily assumed by a person skilled in the art, those that are substantially identical to the constituent elements, and those within a so-called range of equivalents. In the following description, the same reference signs may be assigned to the same constituent elements. Furthermore, redundant description may be omitted.

Figure 1:
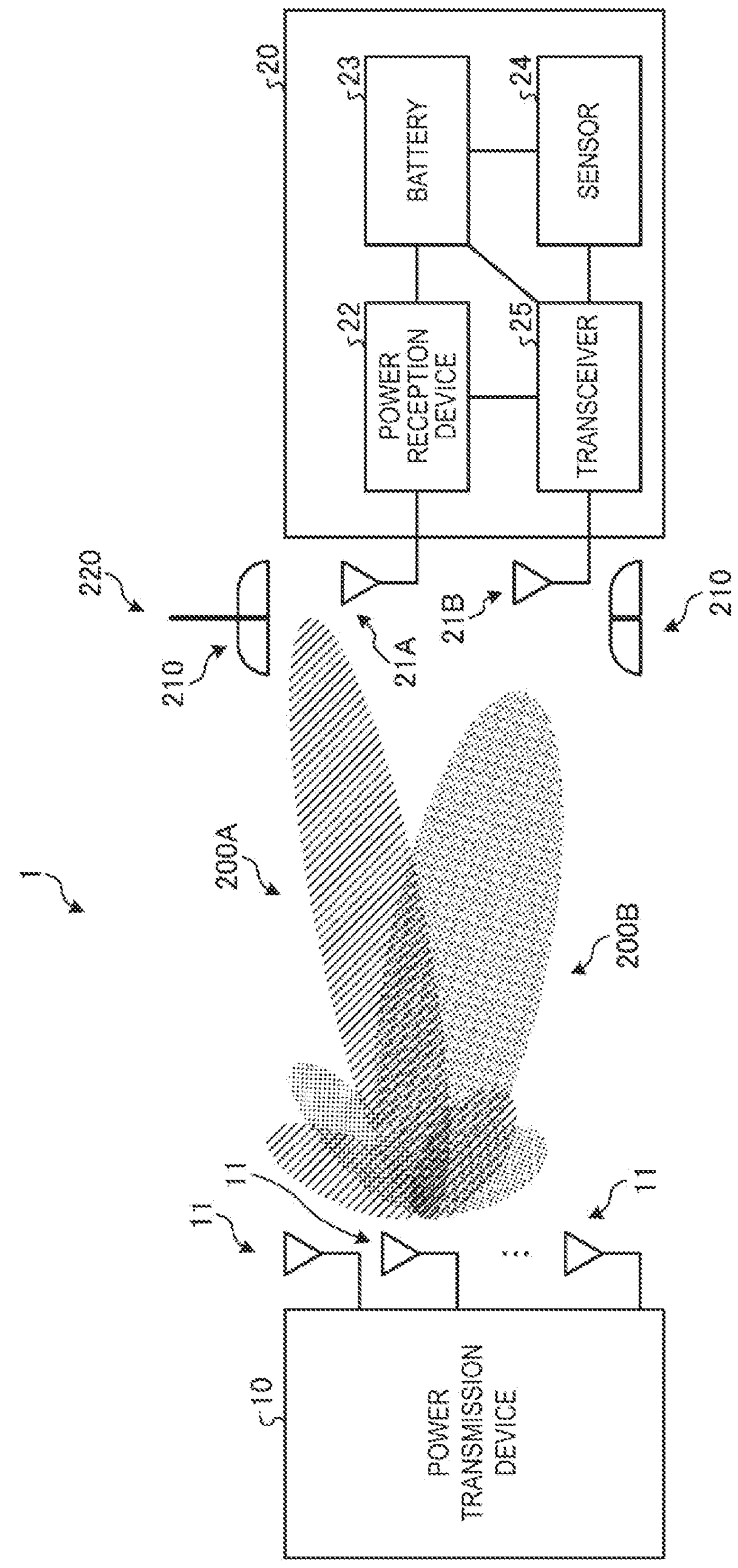
FIG. 1 is a diagram illustrating an overview of a wireless power transmission system for that implements simultaneous transmission of power and information according to an embodiment.

FIG. 1 is a diagram illustrating an overview of a wireless power transmission system that implements simultaneous transmission of power and information according to an embodiment. A system 1 illustrated in FIG. 1 includes, for example, a wireless power transmission system capable of microwave transmission type (space transmission type) wireless power transmission. Wireless power transmission is a technique by which power can be transmitted without using a cable or a plug, for example. Since the microwave transmission type system 1 uses radio waves (microwaves) for energy transmission, the system uses an unmodulated wave having a narrow frequency band. For example, the system 1 can transmit power over a plurality of frequency bands. The plurality of frequency bands include, for example, 920 MHz, 2.4 GHz, and 5.7 GHz in Japan. In the present embodiment, the system 1 makes it possible to improve power supply efficiency and ensure safety differently for different situations. The system 1 can be applied to, for example, space photovoltaic power generation.

In the example illustrated in FIG. 1, the system 1 includes a power transmission device 10 and a power reception unit 20. The power transmission device 10 and the power reception unit 20 communicate a communication signal 210 and a power signal 220 by, for example, spatial multiplexing technology. Spatial multiplexing technology includes, for example, space division multiple access (SDMA). SDMA is a multiple access (multi access) technology that allows a plurality of communication entities to share the same communication path without interference. SDMA is a scheme in which a transmission path is spatially divided such that a plurality of entities simultaneously communicate with each other. In the system 1, the power transmission device 10 simultaneously transmits the communication signal 210 and the power signal 220 to the power reception unit 20 by spatial multiplexing. The system 1 directs a beam 200A including the power signal 220 toward an antenna 21A connected to a power reception device 22 serving as a power transmission target, and directs a beam 200B not including the power signal 220 toward an antenna 21B connected to a transceiver 25. In FIG. 1, the power transmission device 10 is an example of an electronic device. The communication signal 210 and the power signal 220 are examples of an information communication signal and a power transmission signal, respectively.

The power transmission device 10 includes a plurality of antennas 11. The power transmission device 10 can use, for example, multiple-input multiple-output (MIMO) antenna technology. In MIMO, antenna elements at each end of a communication circuit are combined to minimize errors and optimize data rates. In the system 1, the power transmission device 10 is a device that wirelessly transmits power. The power transmission device 10 is a device that can transmit power supply radio waves to the power reception unit 20. The power transmission device 10 emits radio waves with the power signal 220 and the communication signal 210 as adjacent different frequencies.

In the system 1, the power reception unit 20 is a power-fed device that receives power supply radio waves from the power transmission device 10 to obtain power. The power reception unit 20 includes various devices such as an Internet of Things (IoT) sensor, a smartphone, a tablet terminal, a laptop personal computer, a drone, an electric vehicle, an electric bicycle, and a gaming machine. In the present embodiment, a case where the power reception unit 20 is an IoT sensor will be described.

The power reception unit 20 includes, for example, antennas 21A and 21B, the power reception device 22, a battery 23, a sensor 24, and the transceiver 25. The power reception unit 20 is equipped as a separate antenna in a state where the antenna 21A and the antenna 21B are separated by a predetermined distance. The predetermined distance includes, for example, a distance at which the antennas 21A and 21B are not affected by a signal that is not a reception target, and a distance corresponding to a range of directivity control of the power transmission device 10.

The antenna 21A is electrically connected to the power reception device 22. The antenna 21A is, for example, a power receiving antenna. The antenna 21A emits a radio wave including a prescribed signal and receives a radio wave including a power supply signal from the power transmission device 10, for example. The antenna 21A supplies the received radio wave to the power reception device 22.

The antenna 21B is electrically connected to the transceiver 25. The antenna 21B is, for example, an information communication antenna. The antenna 21B transmits sensor data including information detected by the sensor 24 under control of the transceiver 25, for example. The antenna 21B supplies a signal received from the power transmission device 10 to the transceiver 25.

The power reception device 22 transmits a prescribed signal determined between the power reception device 22 and the power transmission device 10. The prescribed signal includes, for example, a beacon and a pilot signal. The power reception device 22 can transmit the prescribed signal at a preset transmission cycle, for example. The power reception device 22 can transmit the prescribed signal by emitting a radio wave including the prescribed signal. The power reception device 22 can transmit the prescribed signal to the power transmission device 10 at a predetermined timing, for example. The predetermined timing includes, for example, a timing at which a certain period of time has elapsed and a designated timing.

The power reception device 22 is electrically connected to the battery 23. The power reception device 22 includes, for example, a wireless power reception device. The power reception device 22 converts the radio wave received by the antenna 21A into a DC current and performs control of charging the battery 23 using the DC current. The power reception device 22 converts the radio wave into the DC current using, for example, a known rectifier circuit.

The battery 23 includes a chargeable battery. The battery 23 includes, for example, a battery compatible with Qi (international standard for wireless power transmission). The battery 23 can supply stored power to each unit or the like that requires power in the power reception device 22. The battery 23 is electrically connected to the sensor 24 and the transceiver 25 and supplies power to the sensor 24, the transceiver 25, and the like.

The sensor 24 includes a plurality of sensors. For example, the plurality of sensors include sensors such as an acceleration sensor, an orientation sensor, and a gyro sensor. The sensor 24 can detect a state, a change, and the like of a measurement target. The sensor 24 is electrically connected to the transceiver 25. The sensor 24 supplies information indicating a detection result to the transceiver 25.

The transceiver 25 transmits and receives an OFDM signal using an OFDM digital modulation scheme. The transceiver 25 forms a plurality of carriers (subcarriers) of different frequencies in a frequency band, and performs multiplexing by simultaneously transmitting and receiving these carriers.

The transceiver 25 includes, for example, a wireless communication device and a control device. The transceiver 25 emits, via the antenna 21B, a radio wave including an OFDM signal indicating a detection result detected by the sensor 24. The transceiver 25 executes control such as data processing, sensing data acquisition, and data management, based on signals received via the antenna 21B.

The description above relates to a functional configuration example of the power reception unit 20 according to the present embodiment. Note that the configuration described above with reference to FIG. 1 is merely an example, and the functional configuration of the power reception unit 20 according to the present embodiment is not limited to the example. In the present embodiment, the functional configuration of the power reception unit 20 can be changed as required in accordance with specifications and operations.

In the present embodiment, the system 1 implements simultaneous wireless transmission of information and power by the power transmission device 10 controlling antenna directivities of the plurality of antennas 11. For example, a center frequency of an OFDM signal is called a null subcarrier and is not used for information communication signals. The system 1 uses a scheme in which a power transmission signal is inserted into the unused null subcarrier. The system 1 performs control (null steering) of subjecting the power signal 220 to reversed-phase combination at the information communication antenna 21B of the power reception unit 20. The system 1 controls the antenna directivity (performs beam-forming) such that the power signal 220 is subjected to in-phase combination at the power transmission antenna 21A of the power reception unit 20. The power transmission device 10 transmits, to the power reception device 22, a signal in which the power signal 220 is superimposed near the center frequency of the communication signal 210. The power transmission device 10 transmits a signal in which the vicinity of the center frequency of the communication signal 210 is nulled to the transceiver 25. Thereby, an inexpensive wireless LAN transceiver circuit, which is widely used for information communication, can be used in the system 1 with no modifications.

In the system 1, a signal obtained by superimposing the communication signal 210 and the power signal 220 is transmitted from the power transmission device 10, but the power signal 220 is subjected to reversed-phase combination only at the information communication antenna 21B, which is the other correspondent. Since the information cannot be demodulated even if another reception device were to receive the signal from the power transmission device 10, the system 1 also provides an effect of privatizing the information and suppressing interception.

Figure 2:
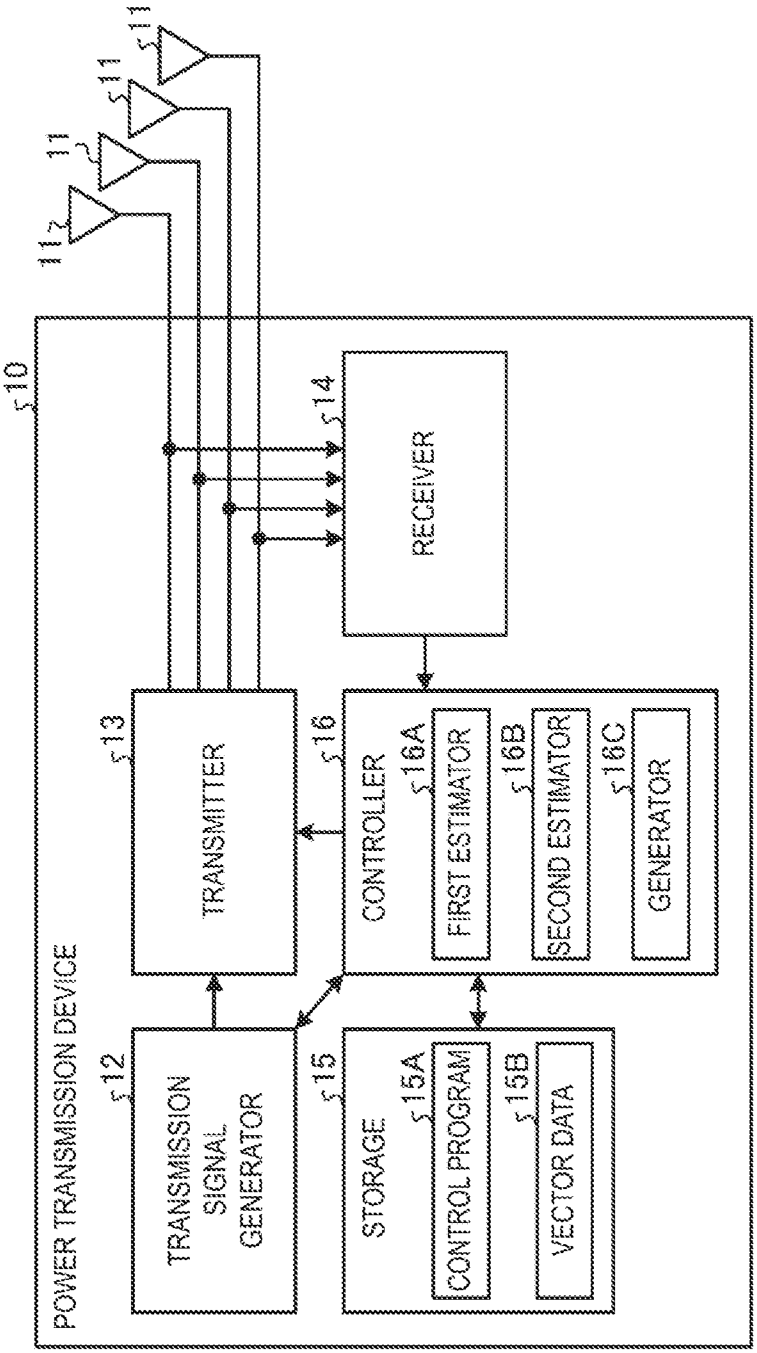
FIG. 2 is a diagram illustrating an example of a configuration of a power transmission device according to an embodiment.

FIG. 2 is a diagram illustrating an example of a configuration of the power transmission device 10 according to an embodiment. As illustrated in FIG. 2, the power transmission device 10 includes the plurality of antennas 11, a transmission signal generator 12, a transmitter 13, a receiver 14, a storage 15, and a controller 16. The controller 16 is electrically connected to the transmission signal generator 12, the transmitter 13, the receiver 14, the storage 15, and the like. In the present embodiment, a case in which the number of the plurality of antennas 11 in the power transmission device 10 is four is described. However, the number of the plurality of antennas 11 is not limited thereto and may be two or more.

The plurality of antennas 11 are configured to be capable of directivity control (beam forming) by digital signal processing. The plurality of antennas 11 form an antenna array. For example, each of the plurality of antennas 11 emits the same radio wave and, by adjusting the phase and power intensity of each of the antennas, the radio waves can be strengthened in a specific direction, cancel each other out and be attenuated in another direction. The plurality of antennas 11 emit radio waves including the transmission signal 200 and receive radio waves including signals from the power reception device 22. The plurality of antennas 11 supply the received signals to the receiver 14. In the plurality of antennas 11, the direction of a beam having maximum emission of radio waves is a main lobe.

The transmission signal generator 12 generates the power signal 220, which is obtained by converting a current to be transmitted to the power reception device 22 into a radio wave. The transmission signal generator 12 generates the transmission signal 200 by converting a current from a power source into a radio wave having a transmission frequency.

The power source includes, for example, a commercial power supply, a DC power supply, and a battery. The transmission signal generator 12 generates the communication signal 210 to be transmitted to the transceiver 25. The transmission signal generator 12 supplies the communication signal 210, which is the generated transmission signal, and the power signal 220 to the transmitter 13.

The transmitter 13 is electrically connected to the plurality of antennas 11. The transmitter 13 emits radio waves including the communication signal 210 and the power supply signal 220 from the plurality of antennas 11. The transmitter 13 applies weights corresponding to the beams 200A and 200B that can be formed by the plurality of antennas 11 to cause the plurality of antennas 11 to emit radio waves in a specific direction. The transmitter 13 applies the weights as instructed by the controller 16 to the plurality of antennas 11.

The receiver 14 is electrically connected to the plurality of antennas 11. The receiver 14 extracts a reception signal from a radio wave received from the power reception device 22 via the antenna 11. The reception signal includes, for example, the above-described prescribed signal transmitted from the power reception device 22 via the antenna 21A and a communication signal transmitted from the transceiver 25 via the antenna 21B. The receiver 14 supplies the extracted reception signal and the like to the controller 16, for example.

The storage 15 can store a program and data. The storage 15 may include any non-transitory storage medium, such as a semiconductor storage medium or a magnetic storage medium. The storage 15 may include a combination of a storage medium, such as a memory card, an optical disk or a magneto-optical disk, and a device for reading the storage medium. The storage 15 may include a storage device used as a temporary storage area, such as a RAM.

The storage 15 can store a control program 15A, vector data 15B, and the like. The control program 15A can implement functions for performing processing related to various operations of the power transmission device 10. The control program 15A can provide functions related to wireless power transmission, communication control, and the like. The vector data 15B includes, for example, data indicating a reception response vector or the like. The reception response vector indicates channel characteristics between transmission and reception antennas estimated from the reception signal. The reception response vector indicates channel characteristics corresponding to the number of antennas, for example. The reception response vector includes, for example, a vector obtained by combining amplitudes, phases, and the like of each of the plurality of antennas 11. The reception response vector includes, for example, reception response vectors corresponding to power use and information communication use. The vector data 15B includes, for example, information indicating reception response vectors of the power reception device 22 and the transceiver 25 estimated based on the reception signal.

The controller 16 includes one or more arithmetic devices. Examples of the arithmetic device include, but are not limited to, a central processing unit (CPU), a system-on-a-chip (SoC), a micro control unit (MCU), a field-programmable gate array (FPGA), and a coprocessor. The controller 16 implements processing related to various operations of the power transmission device 10 by causing the arithmetic device to execute the control program 15A. The controller 16 may implement at least some of the functions provided by the control program 15A by a dedicated integrated circuit (IC).

The controller 16 performs antenna directivity control by executing the control program 15A. For example, the controller 16 controls, for the power signals 220 transmitted from the plurality of antennas 11 to the power reception device 22 and the transceiver 25 connected by spatial multiplexing, a transmission weight such that the beam 200A is directed toward the antenna 21A (first antenna) of the power reception device 22 and a null is directed toward the antenna 21B (second antenna) of the transceiver 25. The controller 16 controls the transmission weight such that the communication signal 210 transmitted at a different frequency adjacent to the power signal 220 is beamed toward the antenna 21A of the power reception device 22 and/or the antenna 21B of the transceiver 25.

The controller 16 includes, for example, functional units such as a first estimator 16A, a second estimator 16B, and a generator 16C. The controller 16 implements each functional unit such as the first estimator 16A, the second estimator 16B, and the generator 16C by executing the control program 15A.

The first estimator 16A receives a frequency division multiplexing signal transmitted from the transceiver 25, and estimates a channel characteristic of a frequency component from a subcarrier adjacent to the frequency component that is not used in the band. The first estimator 16A estimates the reception response vector using a well-known algorithm, such as that disclosed in JP 200243995 A. The first estimator 16A reflects channel characteristics corresponding to the number of antennas 11 in the vector data 15B as the reception response vector for information communication.

The second estimator 16B receives a prescribed signal transmitted from the power reception device 22 and estimates the channel characteristic of the frequency component. The second estimator 16B estimates a channel identity of the center frequency of the prescribed signal. The prescribed signal may have an unmodulated wave or a modulated wave such as an OFDM signal. In the case of a modulated wave such as an OFDM signal, the second estimator 16B estimates the channel characteristic of the center frequency by, for example, interpolation. The second estimator 16B estimates the reception response vector using, for example, the above-described well-known algorithm. The second estimator 16B stores the channel characteristics corresponding to the number of antennas 11 in the vector data 15B as the reception response vector for power transmission.

The generator 16C generates a power transmission weight and an information communication weight from the reception response vector for power transmission and the reception response vector for communication based on the estimation results of the first estimator 16A and the second estimator 16B. As a weight generation method, for example, a zero forcing (ZF) algorithm, a minimum mean square error (MMSE) algorithm, or the like used in MIMO can be used. The generator 16C applies the power transmission weight and the information communication weight to the power signal 220 and the communication signal 210. Thereby, the transmitter 13 multiplies the power signal 220 by the power transmission weight, multiplies the communication signal 210 by the signal weight, adds them together, and transmits the result.

An example of generation of transmission weights by the generator 16C will be described. The generator 16C sets the reception response vector of the prescribed signal received from the power reception device 22 to a vector $h_1$ shown in Equation (1).

Equation 1

$$h_1 = \begin{bmatrix} h_{11} \\ h_{12} \\ \vdots \\ h_{1K} \end{bmatrix} \quad (1)$$

The generator 16C sets the reception response vector of the signal received from the transceiver 25 to a vector $h_2$ shown in Equation (2).

Equation 2

$$h_2 = \begin{bmatrix} h_{21} \\ h_{22} \\ \vdots \\ h_{2K} \end{bmatrix} \quad (2)$$

The generator 16C defines a propagation channel matrix H of the vector $h_1$ and the vector $h_2$, as shown in Equation (3). K in Equation (3) is the number of antenna elements.

Equation 3

$$H = [h_1 h_2] = \begin{bmatrix} h_{11} & h_{21} \\ h_{12} & h_{22} \\ \vdots & \vdots \\ h_{1K} & h_{2K} \end{bmatrix} \quad (3)$$

The generator 16C generates each transmission weight with the transmission weight for power transmission as Equation (4) and the transmission weight for information communication as Equation (5).

$$\alpha_1 * (H * H^H + \sigma^2 * I)^{-1} * z_1 \quad (4)$$

$$\alpha_2 * z_2 \quad (5)$$

Here, $\alpha_1$ and $\alpha_2$ are transmission power adjustment amounts. $H^H$ is a complex conjugate transpose of the propagation channel matrix H. $z_1$ and $z_2$ are complex conjugate vectors of $h_1$ and $h_2$. $\sigma^2$ is noise power. I is an identity matrix.

The functional configuration example of the power transmission device 10 according to the present embodiment has been described above. Note that the configuration described above with reference to FIG. 2 is merely an example, and the functional configuration of the power transmission device 10 according to the present embodiment is not limited to the example. In the present embodiment, the functional configuration of the power transmission device 10 can be changed as necessary in accordance with specifications and operations.

Figure 3:
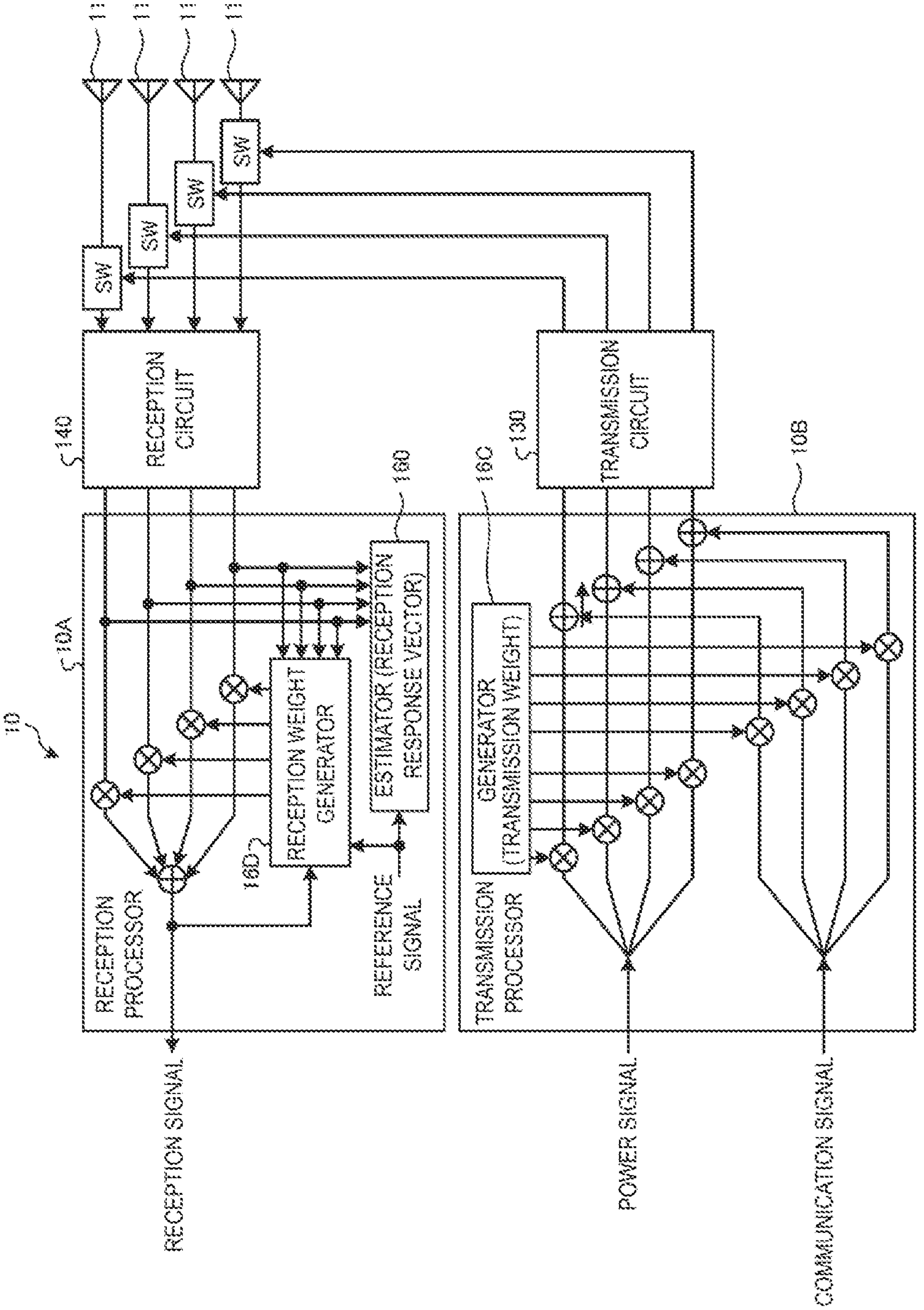
FIG. 3 is a diagram illustrating functional blocks of the power transmission device according to an embodiment.

FIG. 3 is a diagram illustrating a functional block of the power transmission device 10 according to an embodiment. In the example illustrated in FIG. 3, the power transmission device 10 is compatible with dual multiplexing in which the power reception device 22 and the transceiver 25 are connected in spatial multiplexing communication using four antennas 11.

As illustrated in FIG. 3, in the power transmission device 10, signals received by the plurality of antennas 11 are supplied to a reception processor 10A via a reception circuit 140, and a reception signal received from the power reception device 22 and a reception signal received from the transceiver 25 are each extracted by adaptive array processing. The power transmission device 10 supplies transmission signals for the power reception device 22 and the transceiver 25 to a transmission processor 10B, and after the transmission directivity is controlled, the transmission signals are combined and transmitted by the plurality of antennas 11. The power transmission device 10 is configured such that connections between the plurality of antennas 11 and the transmission circuit 130 and the reception circuit 140 can be selectively switched by a switch SW.

In the power transmission device 10, signals received by the plurality of antennas 11 are supplied to the reception processor 10A via the switch SW and the reception circuit 140. The power transmission device 10 supplies a reception signal from the power reception device 22 and/or the transceiver 25 to a plurality of multipliers and to a reception weight generator 16D and an estimator 160. The estimator 160 includes the first estimator 16A and the second estimator 16B described above.

In the power transmission device 10, the reception weight generator 16D outputs a weight for a signal received by each antenna 11 and supplies the weight to the plurality of multipliers. As a reception response vector estimation algorithm used in the estimator 160, a well-known algorithm used in MIMO or the like can be used.

The power transmission device 10 multiplies the signals received by the plurality of antennas 11 and the corresponding weights by the plurality of multipliers, respectively, and adds the results by using an adder. The power transmission device 10 outputs an array output received from the adder as a reception signal from the reception processor, and supplies the array output to the reception weight generator 16D. The power transmission device 10 supplies a known reference signal to the reception weight generator 16D and the estimator 160. The power transmission device 10 converges the reception weight vector in real time to reduce the square of the error between the array output from the adder and the known reference signal. Thereby, the power transmission device 10 can converge the reception directivity from a specific power reception device 22 and a specific transceiver 25 and extract the reception signals from the power reception device 22 and the transceiver 25.

In the power transmission device 10, the estimator 160 calculates reception response vectors of the power reception device 22 and the transceiver 25 in response to reception signals received by the plurality of antennas 11 and the known reference signal, and supplies the reception response vectors to the generator 16C of the transmission processor 10B. The power transmission device 10 generates a power transmission weight and an information communication weight from the reception response vector for power transmission and the reception response vector for communication, respectively. For each of the plurality of antennas 11, the power transmission device 10 multiplies the power signal 220 by the power transmission weight, multiplies the communication signal 210 by the signal weight, and transmits a transmission signal obtained by adding these signals from the plurality of antennas 11 via the transmission circuit 130.

The power transmission device 10 supplies a reception response vector including components of an antenna combination corresponding to the power reception device 22 and the transceiver 25 to the generator 16C, and generates a transmission weight vector on the basis of the reception response vector. The power transmission device 10 multiplies the power signal 220 and the communication signal 210 by a transmission weight constituting the transmission weight vector by a plurality of multipliers, adds the multiplication results by an adder, and transmits the resultant transmission signal from the plurality of antennas 11 via the transmission circuit 130.

Figure 4:
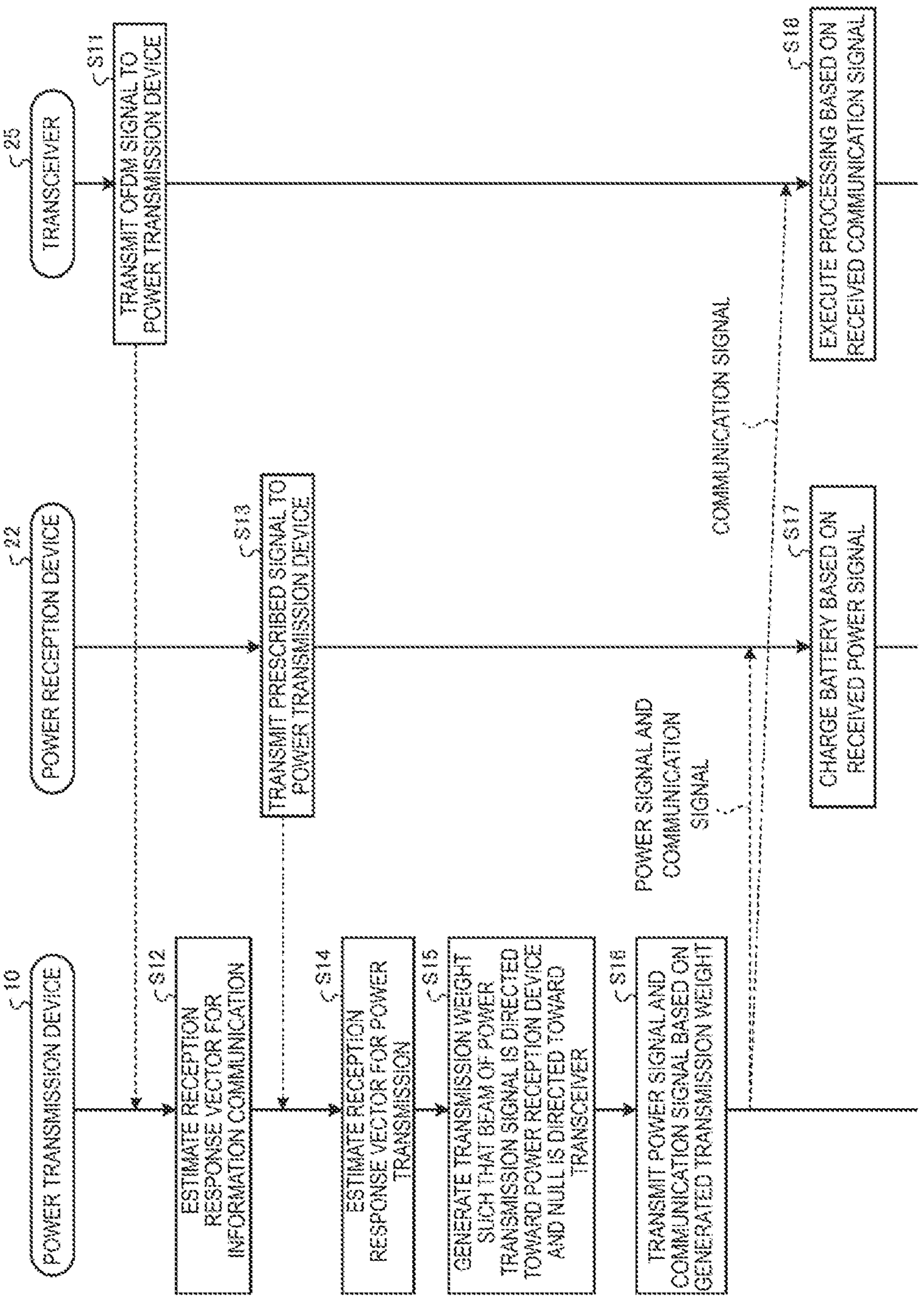
FIG. 4 is a diagram illustrating an example of a sequence of the system according to an embodiment.

FIG. 4 is a diagram illustrating an example of a sequence of the system 1 according to an embodiment. In the example illustrated in FIG. 4, in the system 1, the power transmission device 10 and the power reception unit 20 are provided in a radio wave propagation environment.

The transceiver 25 of the power reception unit 20 transmits an OFDM signal to the power transmission device (step S11). For example, the transceiver 25 transmits an OFDM signal to the power transmission device 10 by emitting a radio wave including the OFDM signal for information communication indicating the detection result obtained by detection by the sensor 24 from the antenna 21B.

Upon receiving the OFDM signal via the plurality of antennas 11, the power transmission device 10 estimates a reception response vector for information communication (step S12). Since the center frequency of the OFDM signal is the null subcarrier, the channel characteristics estimated by the power transmission device 10 do not include the channel characteristic of the center frequency. Therefore, the power transmission device 10 estimates the channel characteristic of the center frequency from other adjacent subcarriers by interpolation or the like. The power transmission device 10 reflects channel characteristics corresponding to the number of antennas 11 in the vector data 15B of the storage 15 as the reception response vector for information communication.

The power reception device 22 of the power reception unit 20 transmits the prescribed signal to the power transmission device 10 (step S13). For example, the power reception device 22 transmits the prescribed signal to the power transmission device 10 by emitting a radio wave including the prescribed signal from the antenna 21A in accordance with the transmission cycle.

Upon receiving the prescribed signal via the plurality of antennas 11, the power transmission device 10 estimates the reception response vector for power transmission (step S14). The power transmission device 10 estimates the channel characteristic of the center frequency by interpolation or the like from the prescribed signal when the prescribed signal is an unmodulated wave or from another subcarrier adjacent to the prescribed signal when the prescribed signal is an OFDM signal. The power transmission device 10 reflects channel characteristics corresponding to the number of antennas 11 in the vector data 15B as the reception response vector for power transmission.

The power transmission device 10 generates a transmission weight such that abeam of the power transmission signal is directed toward the power reception device 22 and a null is directed toward the transceiver 25 (step S15). The power transmission device 10 generates a power transmission weight and an information communication weight from the reception response vector for power transmission and the reception response vector for communication of the vector data 15B. In transmission weight generation using spatial multiplexing technology in wireless communication, on the assumption that signals from a plurality of users are received at the same time, the weight at the time of reception may be copied and used without modification. However, in the system 1 according to the embodiment, there is no guarantee that the prescribed signal for power transmission and the wireless signal received from the transceiver 25 are transmitted at the same timing. For this reason, the power transmission device 10 generates a power transmission weight and an information communication weight using the reception response vector.

The power transmission device 10 transmits the power signal 220 and the communication signal 210 based on the generated transmission weight (step S16). The power transmission device 10 multiplies the power signal 220 by the power transmission weight, multiplies the communication signal 210 by the signal weight, adds these signals, and transmits the result. Thereby, the power transmission device 10 emits the radio wave including the communication signal 210 and the power signal 220 from the plurality of antennas 11 toward the power reception device 22, and controls the directivity such that the power signal 220 is subjected to reversed-phase combination and is directed from the plurality of antennas 11 toward the antenna 21B connected to the transceiver 25.

The power reception device 22 charges the battery 23 on the basis of the received power signal 220 (step S17). For example, the power reception device 22 converts the radio wave received by the antenna 21A into a DC current and charges the battery 23 using the DC current.

The transceiver 25 executes processing based on the received communication signal 210 (step S18). For example, the transceiver 25 executes processing such as communication control, sensing by the sensor 24, and data management.

In the system 1, the power transmission device 10 does not need to direct a null toward the antenna 21A connected to the power reception device 22 for the radio wave of the communication signal 210, and communication is possible even when the reception level of the communication signal 210 is lower than that of the power signal 220. Therefore, the radio wave of the communication signal 210 does not necessarily need to be beamed toward the transceiver 25. For this reason, the power transmission device 10 of the system 1 may prioritize the transmission weight for power transmission and generate the transmission weight for information communication to reduce the influence on power transmission.

As for the transmission weight for power transmission, the amplitude of the weight is generally different for each antenna 11 for directivity control for directing a null, and information communication is superimposed only on the antenna 11 for which the weight has a small amplitude. Thereby, even when the power transmission signal and the information communication signal are superimposed, the power transmission device 10 can simultaneously transmit power and information without being affected by the limitation of an instantaneous maximum output caused by the performance of a transmission amplifier.

The power transmission device 10 can control the transmission weight such that the power signal 220 transmitted from the plurality of antennas 11 to the power reception device 22 and the transceiver 25 connected by spatial multiplexing is beamed toward the antenna 21A of the power reception device 22 and a null is directed toward the antenna 21B of the transceiver 25. Thereby, the power transmission device 10 can simultaneously implement power supply to the power reception device 22 and communication with the transceiver 25. As a result, the power transmission device 10 can implement simultaneous wireless transmission of information and power without using a special configuration that separates the power signal 220 and the communication signal 210 in the power reception device 22.

The power transmission device 10 can control, for the power signal 220 transmitted from the plurality of antennas 11 to the power reception device 22 and the transceiver 25 connected by spatial multiplexing, the transmission weight such that a null is directed toward the antenna 21B of the transceiver 25. Thereby, in the system 1, an inexpensive wireless local area network (LAN) or the like can be used as the transceiver 25, and thus the configuration on the power reception side can be simplified.

The power transmission device 10 receives a frequency division multiplexing signal transmitted from the transceiver 25, and estimates channel characteristics of a frequency component from a subcarrier adjacent to the frequency component that is not used in the band. The power transmission device 10 receives the prescribed signal transmitted from the power reception device 22 and estimates the channel characteristics of the frequency component. The power transmission device 10 generates a power transmission weight and an information communication weight from the reception response vector for power transmission and the reception response vector for communication based on the estimation results. With this configuration, the power transmission device 10 generates the transmission weight according to the channel characteristics of the radio waves from the power reception device 22 and the transceiver 25, and thus can accurately direct, for the power signal 220, the null toward the antenna 21B of the transceiver 25.

The power transmission device 10 can superimpose the transmission weight for information communication on the antenna 11 for which the amplitude of the transmission weight for power transmission is equal to or less than a predetermined level. When the power signal 220 and the communication signal 210 are superimposed and transmitted, it is necessary to consider the amplitude of the transmission weight of the power signal 220, the amplitude of the transmission weight of the communication signal 210, and the instantaneous power of the communication signal 210 because the communication signal 210 is a modulated wave. The predetermined level includes, for example, a threshold value (level) for determining whether performance degradation occurs due to characteristics of the transmission amplifier even when the transmission weight of the communication signal 210 and the instantaneous maximum power consumption of the communication signal 210 are taken into consideration. Even after the communication signal 210 and the power signal 220 are superimposed, the power transmission device 10 can simultaneously transmit power and information without being affected by the limitation of the instantaneous maximum output caused by the performance of the transmission amplifier.

In the above-described system 1, the power transmission device 10 uses a common reception weight when receiving an OFDM signal and a common transmission weight when transmitting an OFDM signal for all subcarriers, but may use a different weight for each subcarrier.

In the above-described system 1, a case in which the power transmission device 10 and the power reception unit 20 are provided on a one-to-one basis has been described, but the present invention is not limited thereto. For example, the system 1 may include a pair or a plurality of the power transmission devices 10 and the power reception units 20.

In the above-described system 1, a case in which the power transmission device 10 uses the same antenna 11 for reception of an OFDM signal for information communication and for power transmission has been described, but the present invention is not limited thereto. For example, the system 1 may transmit an OFDM signal for information communication via another antenna on the power transmission side.

Figure 5:
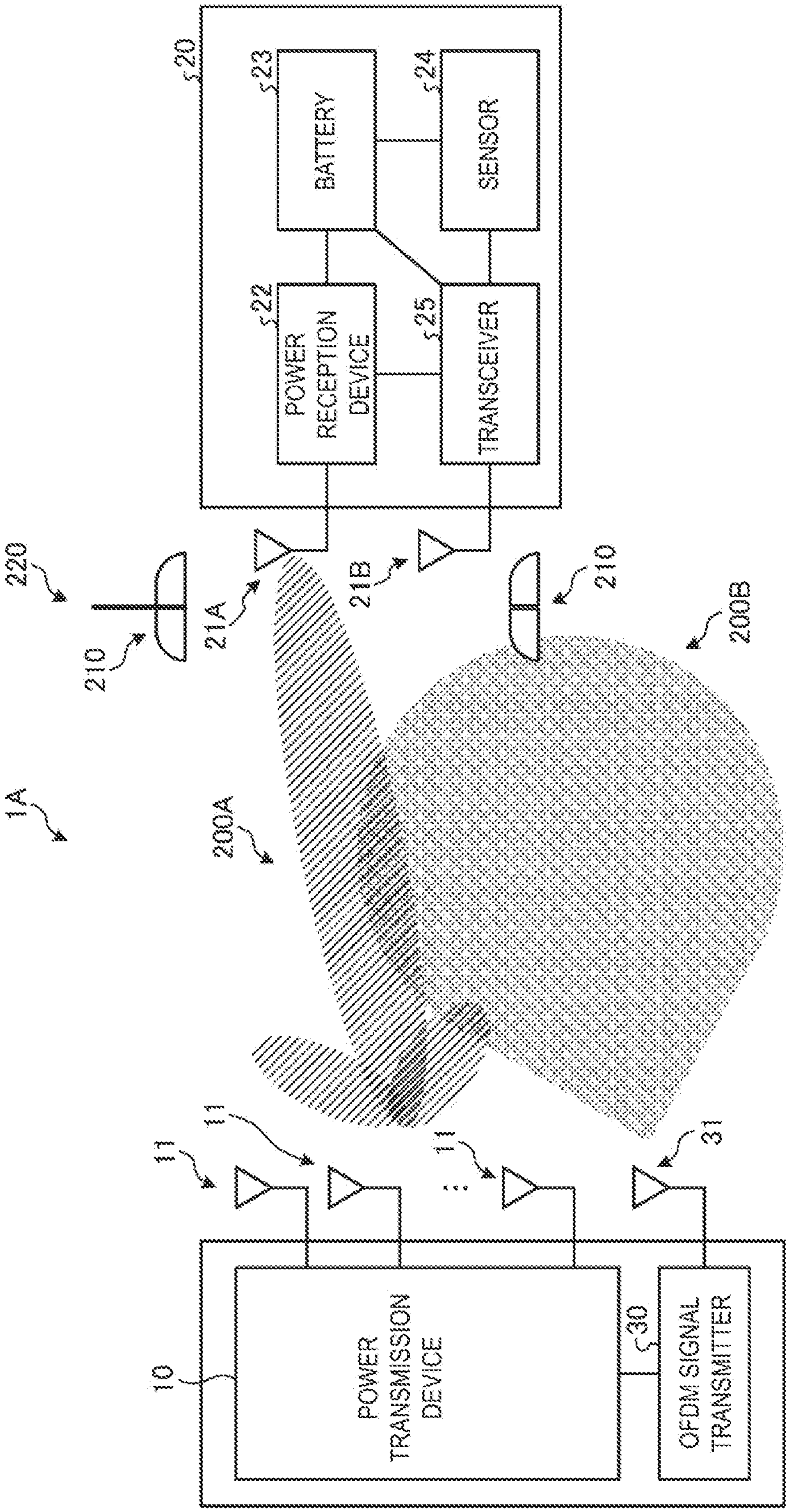
FIG. 5 is a diagram illustrating another configuration example of the wireless power transmission system according to an embodiment.
Figure 6:
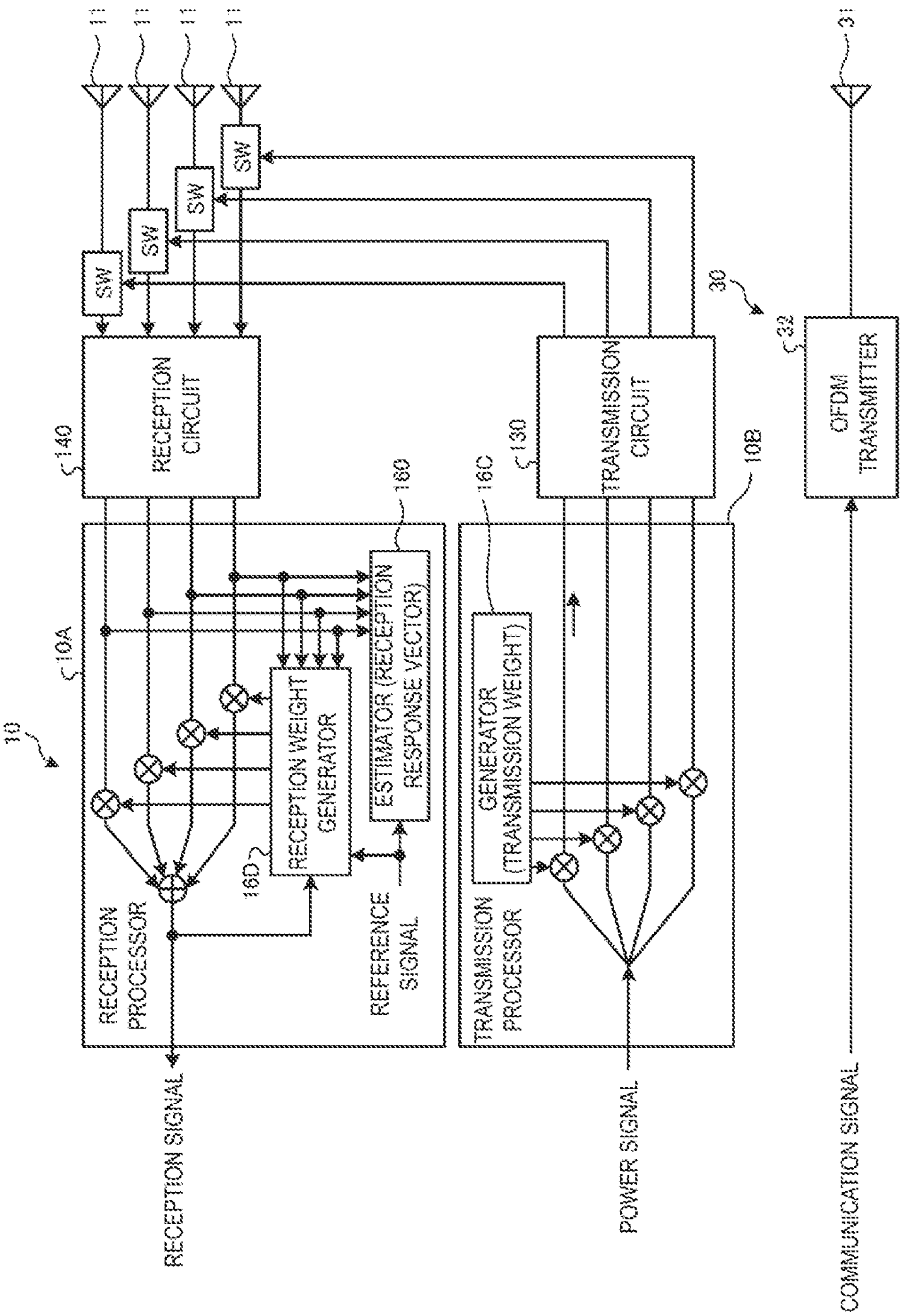
FIG. 6 is a diagram illustrating functional blocks of the power transmission device and an OFDM signal transmitter according to an embodiment.

FIG. 5 is a diagram illustrating another configuration example of the wireless power transmission system according to an embodiment. FIG. 6 is a diagram illustrating a functional block of the power transmission device 10 and an OFDM signal transmitter 30 according to an embodiment.

A system 1A illustrated in FIG. 5 includes a power transmission device 10, a power reception unit 20, and an OFDM signal transmitter 30. The power transmission device 10 and the OFDM signal transmitter 30 are electrically connected to each other. In the system 1A, the power transmission device 10 emits the power signal 220 from the antenna 11 to the power reception unit 20. At this time, the power transmission device 10 directs the beam 200A toward the antenna 21A connected to the power reception device 22 as a power transmission target, and at the same time, directs a null toward the antenna 21B connected to the transceiver 25. The OFDM signal transmitter 30 emits the communication signal 210 from an antenna 31 and transmits the communication signal 210 to the transceiver 25 of the power reception unit 20. Thereby, the power transmission device 10 implements simultaneous transmission of power and information between the power transmission device 10 and the power reception unit 20 using the power signal 220 and the communication signal 210.

As illustrated in FIG. 6, in the power transmission device 10, the estimator 160 including the first estimator 16A and the second estimator 16B calculates reception response vectors of the power reception device 22 and the transceiver 25, respectively, in response to reception signals received by the plurality of antennas 11 and a known reference signal, and supplies the reception response vectors to the generator 16C of the transmission processor 10B. The power transmission device 10 generates a power transmission weight from the reception response vector for power transmission and the reception response vector for communication. The power transmission device 10 transmits a transmission signal obtained by multiplying the power signal 220 by the power transmission weight, for each of the plurality of antennas 11, from each of the plurality of antennas 11 via the transmission circuit 130. The power transmission device 10 transmits the communication signal 210 via the antenna 31 connected to the OFDM signal transmitter 30.

The OFDM signal transmitter 30 includes an OFDM transmitter 32 electrically connected to the antenna 31. The OFDM transmitter 32 emits, from the antenna 31, a radio wave including the communication signal 210 from the power transmission device 10. The OFDM signal transmitter 30 may or may not synchronize the signal transmission of the power transmission device 10 with the signal of the OFDM signal transmitter 30.

As described above, since the system 1A does not need to consider the transmission weight of the communication signal 210 in the power transmission device 10, the system 1A can simultaneously transmit power and information without being affected by the limitation of the instantaneous maximum power caused by the performance of the transmission amplifier.

In the spatial multiplexing technology in wireless communication, the directivity is controlled such that the power signal 220 reaches only the antenna 21A for power transmission and the communication signal 210 reaches only the antenna 21B for information communication. However, the present embodiment, the system 1, and the system 1A described above are not limited thereto. The power transmission device 10 performs control such that the power signal 220 does not leak into the transceiver 25, but the communication signal 210 may leak into the power reception device 22. That is, the spatial multiplexing technology in the present embodiment is a technology different from the spatial multiplexing technology in wireless communication.

In the embodiment described above, a case in which the power transmission device 10 in the system 1 and the system 1A is an electronic device has been described, but the present invention is not limited thereto. The electronic device may be implemented by, for example, a control device that controls a power supply device capable of emitting a power supply radio wave, a computer incorporated in the power supply device, or the like. In addition, although a case where the system 1 and the system 1A are wireless power transmission systems has been described, the present invention is not limited thereto. For example, the system 1 and the system 1A can be applied to a system or the like that performs wireless communication in a radio wave propagation environment.

Embodiments have been described in order to fully and clearly disclose the technology according to the appended claims. However, the appended claims are not to be limited to the embodiments described above and may be configured to embody all variations and alternative configurations that those skilled in the art may make within the underlying matter set forth herein. A person skilled in the art may make various variations or modifications to the present disclosure based on the present disclosure. Therefore, these variations or modifications are included within the scope of the present disclosure. For example, in each embodiment, each functional unit, each means, each step, and the like can be added to another embodiment or replaced with the functional unit, means, step, and the like of another embodiment so as not to be logically inconsistent. In addition, in each embodiment, a plurality of the functional units, means, steps, and the like can be combined into one or divided. In addition, each of the embodiments of the present disclosure described above is not limited to being carried out faithfully to each of the embodiments described above, and can be carried out by combining each feature or partly omitting each feature as required.

Supplementary Note 1

An electronic device including:

a plurality of antennas;

a controller configured to control, for power transmission signals transmitted from the plurality of antennas to a power reception device for power transmission and an information signal transceiver, a transmission weight such that a beam is directed toward a first antenna of the power reception device for power transmission and a null is directed toward a second antenna of the information signal transceiver; and a transmitter configured to transmit a transmission signal for power transmission using the transmission weight, wherein the controller includes:

a first estimator configured to receive a frequency division multiplexing signal transmitted from the information signal transceiver and to estimate a channel characteristic of a frequency component from a subcarrier adjacent to the frequency component that is not used in a band;

a second estimator configured to receive a prescribed signal transmitted from the power reception device for power reception device and to estimate a channel characteristic of the frequency component; and a generator configured to generate a power transmission weight from a reception response vector for power transmission and a reception response vector for communication based on estimation results of the first estimator and the second estimator.

Supplementary Note 2

A power transmission system including:

an electronic device; and a power reception unit to which power is fed by a radio wave received from the electronic device, wherein the electronic device includes:

a plurality of antennas;

a controller configured to control, for power transmission signals transmitted from the plurality of antennas to a power reception device for power transmission and an information signal transceiver, a transmission weight such that a beam is directed toward a first antenna of the power reception device for power transmission and a null is directed toward a second antenna of the information signal transceiver; and a transmitter configured to transmit a transmission signal for power transmission using the transmission weight.

wherein the controller includes:

a first estimator configured to receive a frequency division multiplexing signal transmitted from the information signal transceiver and to estimate a channel characteristic of a frequency component from a subcarrier adjacent to the frequency component that is not used in a band; a second estimator configured to receive a prescribed signal transmitted from the power reception device for power reception device and to estimate a channel characteristic of the frequency component; and a generator configured to generate a power transmission weight from a reception response vector for power transmission and a reception response vector for communication based on estimation results of the first estimator and the second estimator, and wherein the power reception unit includes:

the first antenna configured to receive the power transmission signal from the electronic device, and the second antenna separated from the first antenna by a predetermined distance and configured to receive the information communication signal that occupies a frequency band different from that of the power transmission signal.

Supplementary Note 3

A control method including:

controlling, by an electronic device including a plurality of antennas, for power transmission signals transmitted from the plurality of antennas to a power reception device for power transmission and an information signal transceiver, a transmission weight such that a beam is directed toward a first antenna of the power reception device for power transmission and a null is directed toward a second antenna of the information signal transceiver;

causing, by the electronic device, a transmitter to transmit a transmission signal for power transmission using the transmission weight;

by the electronic device, receiving a frequency division multiplexing signal transmitted from the information signal transceiver and estimating a channel characteristic of a frequency component from a subcarrier adjacent to the frequency component that is not used in a band;

by the electronic device, receiving a prescribed signal transmitted from the power reception device for power reception device and estimating a channel characteristic of the frequency component; and generating, by the electronic device, a power transmission weight from a reception response vector for power transmission and a reception response vector for communication based on estimation results.

Supplementary Note 4

A control program for causing an electronic device including a plurality of antennas to execute:

controlling, for power transmission signals transmitted from the plurality of antennas to a power reception device for power transmission and an information signal transceiver, a transmission weight such that a beam is directed toward a first antenna of the power reception device for power transmission and a null is directed toward a second antenna of the information signal transceiver;

causing a transmitter to transmit a transmission signal for power transmission;

receiving a frequency division multiplexing signal transmitted from the information signal transceiver and estimating a channel characteristic of a frequency component from a subcarrier adjacent to the frequency component that is not used in a band;

receiving a prescribed signal transmitted from the power reception device for power reception device and estimating a channel characteristic of the frequency component; and generating a power transmission weight from a reception response vector for power transmission and a reception response vector for communication based on estimation results.

REFERENCE SIGNS

1 System
10 Power transmission device
11 Antenna
12 Transmission signal generator
13: Transmitter
14: Receiver
15 Storage
15A Control program
15B Vector data
16 Controller
16A First estimator
16B Second estimator
16C Generator
20 Power reception unit
21A, 21B Antenna
22 Power reception device
23 Battery
24 Sensor
25 Transceiver
200A, 200B Beam
210 Communication signal
220 Power signal

The invention claimed is:

1. An electronic device comprising:

a plurality of antennas;

a controller configured to control, for power transmission signals transmitted from the plurality of antennas to a power reception device for power transmission and an information signal transceiver connected by spatial multiplexing, a transmission weight such that a beam is directed toward a first antenna of the power reception device for power transmission and a null is directed toward a second antenna of the information signal transceiver; and a transmitter configured to transmit, using the transmission weight, a transmission signal obtained by superimposing the power transmission signal and an information communication signal, wherein the controller further comprises:

a first estimator configured to receive a frequency division multiplexing signal transmitted from the information signal transceiver and to estimate a channel characteristic of a frequency component from a subcarrier adjacent to the frequency component that is not used in a band; and a generator configured to generate a power transmission weight and an information communication weight from a reception response vector for power transmission and a reception response vector for communication based on estimation results of at least the first estimator.

2. The electronic device according to claim 1, wherein the controller controls, for an information communication signal of a different frequency adjacent to the power transmission signal, the transmission weight such that a beam is directed toward the first antenna of the power reception device for power transmission and the second antenna of the information signal transceiver.

3. The electronic device according to claim 1, wherein the controller further comprises:

a second estimator configured to receive a prescribed signal transmitted from the power reception device for power reception device and to estimate a channel characteristic of the frequency component, wherein the generator is configured to generate the power transmission weight and the information communication weight from the reception response vector for power transmission and the reception response vector for communication based on the estimation results of the first estimator and the second estimator.

4. The electronic device according to claim 3, wherein the transmitter multiplies the power transmission signal by the power transmission weight, multiplies the information communication signal by a signal weight, adds the multiplied signals, and to transmit the transmission signal.

5. The electronic device according to claim 4, wherein the controller is configured to superimpose the information communication weight on an antenna in which an amplitude of the power transmission weight is equal to or less than a predetermined level.

6. A control method comprising:

controlling, by an electronic device comprising a plurality of antennas, for power transmission signals transmitted from the plurality of antennas to a power reception device for power transmission and an information signal transceiver connected by spatial multiplexing, a transmission weight such that a beam is directed toward a first antenna of the power reception device for power transmission and a null is directed toward a second antenna of the information signal transceiver;

causing, by the electronic device, a transmitter to transmit, using the transmission weight, a transmission signal obtained by superimposing the power transmission signal and an information communication signal;

causing, by the electronic device, a first estimator to receive a frequency division multiplexing signal transmitted from the information signal transceiver and to estimate a channel characteristic of a frequency component from a subcarrier adjacent to the frequency component that is not used in a band; and causing, by the electronic device, a generator configured to generate a power transmission weight and an information communication weight from a reception response vector for power transmission and a reception response vector for communication based on estimation results of at least the first estimator.

7. A non-transitory computer readable recording medium storing therein a control program for causing an electronic device comprising a plurality of antennas to execute:

controlling, for power transmission signals transmitted from the plurality of antennas to a power reception device for power transmission and an information signal transceiver connected by spatial multiplexing, a transmission weight such that a beam is directed toward a first antenna of the power reception device for power transmission and a null is directed toward a second antenna of the information signal transceiver;

causing a transmitter to transmit, using the transmission weight, a transmission signal obtained by superimposing the power transmission signal and an information communication signal;

causing a first estimator to receive a frequency division multiplexing signal transmitted from the information signal transceiver and to estimate a channel characteristic of a frequency component from a subcarrier adjacent to the frequency component that is not used in a band; and causing a generator configured to generate a power transmission weight and an information communication weight from a reception response vector for power transmission and a reception response vector for communication based on estimation results of at least the first estimator.

* * * * *